US012654841B2

(12) United States Patent
Schlipf et al.

(10) Patent No.: US 12,654,841 B2
(45) Date of Patent: Jun. 16, 2026

(54) WING FOR AN AIRCRAFT

(71) Applicant: Airbus Operations GmbH, Hamburg (DE)

(72) Inventors: Bernhard Schlipf, Hamburg (DE); Jan Haunert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 24 days.

(21) Appl. No.: 18/519,478

(22) Filed: Nov. 27, 2023

(65) Prior Publication Data

US 2024/0174347 A1 May 30, 2024

(30) Foreign Application Priority Data

Nov. 30, 2022 (EP) ..................................... 22210457

(51) Int. Cl.
  *B64C 9/18* (2006.01)
  *B64C 9/14* (2006.01)
(52) U.S. Cl.
  CPC .......... *B64C 9/18* (2013.01); *B64C 2009/143* (2013.01)
(58) Field of Classification Search
  CPC ........ B64C 2009/143; B64C 3/38; B64C 3/50
  See application file for complete search history.

(56) References Cited

U.S. PATENT DOCUMENTS

| | | | | |
|---|---|---|---|---|
| 1,422,616 A | * | 7/1922 | Frederick | B64C 21/02 244/215 |
| 2,169,416 A | | 8/1939 | Griswold | |
| 3,493,196 A | | 2/1970 | Mccall | |
| 3,921,942 A | * | 11/1975 | Bracka | B64C 21/025 244/87 |
| 2005/0011994 A1 | | 1/2005 | Sakurai et al. | |
| 2005/0061922 A1 | * | 3/2005 | Milliere | B64C 9/34 244/213 |
| 2007/0114329 A1 | * | 5/2007 | Lacy | B64C 9/16 244/34 R |

FOREIGN PATENT DOCUMENTS

GB 2588766 A 5/2021

OTHER PUBLICATIONS

European Search Report for corresponding European Patent Application No. 22210457.2 dated May 3, 2023; priority document.

* cited by examiner

*Primary Examiner* — Joshua D Huson
(74) *Attorney, Agent, or Firm* — Greer, Burns & Crain, Ltd.

(57) ABSTRACT

An aircraft wing, including a main wing and a trailing edge high lift assembly movably arranged at a main wing trailing edge. The trailing edge high lift assembly includes a flap and a connection assembly movably mounting the flap to the main wing, the flap being movable between retracted and extended positions. In the extended position, a gap is present between a main wing lower rear panel and a flap leading-edge section. In the retracted position, the gap is closed or minimized. The flap is movable between the extended position, a first retracted position, and a second retracted position where the flap is moved beyond the first retracted position in a forward direction, and the wing includes a gap closing device configured to close or minimize the gap in both the first and second retracted flap positions, and to open the gap in the extended flap position.

19 Claims, 3 Drawing Sheets

WING FOR AN AIRCRAFT

CROSS-REFERENCES TO RELATED APPLICATIONS

This application claims the benefit of the European patent application No. 22210457.2 filed on Nov. 30, 2022, the entire disclosures of which are incorporated herein by way of reference.

FIELD OF THE INVENTION

The present invention relates to a wing for an aircraft. Further aspects of the invention relate to a gap closing device for such a wing, and to an aircraft comprising such a wing and/or comprising such a gap closing device.

BACKGROUND OF THE INVENTION

The wing comprises a main wing and a trailing edge high lift assembly. The trailing edge high lift assembly is movably arranged at a trailing edge of the main wing and comprises a flap and a connection assembly. The connection assembly movably mounts the flap to the main wing, such that the flap is movable relative to the main wing between at least one retracted position with a reduced chord length and/or curvature of the wing, and at least one extended position with an extended chord length and/or curvature of the wing. The connection assembly preferably comprises an actuator unit, e.g., including a rotary motor or a linear motor, for moving the flap between the at least one retracted position and the at least one extended position.

In the at least one extended position a gap is present between a lower rear panel, preferably skin panel, of the main wing and a leading edge section of the flap to allow an air flow to pass between the flap and the main wing, in order to energize the air flow along the top surface of the flap. In the at least one retracted position the gap is closed or minimized, so that an air flow between the flap and the main wing is inhibited or at least minimized, in order to reduce drag.

Similar wings are known in the art. Some known wings comprise a trailing edge high lift assembly having a flap that is movable relative to the main wing in a rotational manner or in a combined linear and rotational manner, between one retracted position and at least one extended position. Such trailing edge high lift assemblies are designed to be deployed, i.e., moved to the at least one extended position, during take-off and landing of an aircraft to increase lift and reduce minimum air speed by increasing wing area, curvature, and angle of attack, and to be retracted during cruise flight when air speed is high to reduce drag.

More recent investigations have shown that it might be advantageous to have a morphing wing that might adjust wing area, curvature, and angle of attack during the entire flight, e.g., as a "real-time" response to gust or to optimize lift, drag and structural loading during the flight. This can be achieved, e.g., by the two-part flap comprising leading edge part and trailing edge part which can be moved relative to one another as required, and/or by adding further setting positions of the flap. However, aerodynamic performance of the wing should not be negatively affected in any of the settings of the flap.

SUMMARY OF THE INVENTION

An object of the invention is to provide a wing that might be used as a morphing wing capable of adjusting wing area, curvature, and angle of attack during the entire flight, while having optimized aerodynamic performance throughout all flap settings.

This object is achieved in that the flap is movable between at least one extended position, a first retracted position, and a second retracted position. The first retracted position might preferably be a neutral retracted position, preferably for cruise flight under normal conditions. In the second retracted position, which might preferably be a negative retracted position, the flap is moved beyond the first retracted position in a forward direction further towards a leading edge of the main wing, thereby preferably further reducing the chord length of the wing compared to the first retracted position. Further, the wing comprises a gap closing means for closing or minimizing the gap comprising a gap closing device configured to close or minimize the gap in both the first retracted position and the second retracted position of the flap, and to open the gap in the at least one extended position of the flap.

By such a wing introducing a second retracted position with reduced chord length, drag and structural loading can be further reduced and flight parameters can be optimized, while at the same time the gap between the lower rear panel of the main wing and the leading edge section of the flap can be kept closed by the gap closing device in both the first retracted position and the second retracted position, and can be kept open for air to pass through in the one or more extended position, in order to achieve optimized aerodynamic performance throughout all positions of the flap.

The wing might comprise multiple gap closing devices formed as described above and arranged next to each other in a span direction of the wing.

According to a preferred embodiment, the gap closing device is a passive device, i.e., it does not include an actuator and/or is movable without being directly actuated. This relates to a very simple and lightweight form of the gap closing device.

According to a further preferred embodiment, the gap closing device is movably mounted to the main wing. In such a way, it can adjust its position to close or open the gap as required.

According to a further preferred embodiment, the gap closing device is movable in one direction, in particular the forward direction, by contact with the flap when the flap is moved relative to the main wing, preferably between the first retracted position and the second retracted position, and is movable in the opposite direction, in particular a rearward direction, preferably between the second retracted position and the first retracted position, preferably by a biasing member, such as a spring. In other words, the gap closing device may be pushed by the flap from the first retracted position to the second retracted position, and may be reversed from the second retracted position to the first retracted position by the biasing member. In such a way, a very simple, efficient, and reliable passive gap closing device is formed.

According to a further preferred embodiment, the gap closing device comprises a closing panel, preferably in the form of a skin panel, forming an extension of the lower rear panel of the main wing in the rearward direction, i.e., in the direction to the flap. The closing panel is movable relative to the lower rear panel of the main wing between an elongated position, where the closing panel forms a greater or maximum extension of the lower rear panel of the main wing, and a shortened position, where the closing panel forms a smaller or minimum extension of the lower rear panel of the main wing. By such a movable closing panel, a very simple and efficient gap closing device is formed. It is also possible that multiple closing panels are provided next to each other in the span direction.

In particular, it is preferred that the gap closing device is configured such that when the flap is in the at least one extended position, and in the first retracted position, the closing panel is in the elongated position, while when the flap is in the second retracted position, the closing panel is in the shortened position. In such a way, a very simple, efficient, and reliable passive gap closing device is formed.

It is further preferred that the gap closing device comprises a panel guide movably mounting the closing panel to the main wing and configured for guiding movement of the closing panel, preferably linear movement of the closing panel, between the elongated position and the shortened position. Such a panel guide represents a very simple and efficient way to enable a defined movement of the closing panel.

In particular, it is preferred that the panel guide is a linear guide configured for guiding the closing panel essentially in a way of a linear extension of the lower rear panel of the main wing. Such a linear panel guide leads to a very simple and reliable design of the panel guide and the closing panel.

It is further preferred that the panel guide is arranged at and preferably mounted to the inner surface of the lower rear panel of the main wing, preferably in parallel to the lower rear panel of the main wing or for guiding the closing panel in parallel to the lower rear panel of the main wing. This relates to a very simple and efficient minimum-drag arrangement of the panel guide.

It is also preferred that the gap closing device is formed in a way of a drawer system, wherein the panel guide is formed as a drawer box slidably receiving the closing panel in the way of a drawer, so that the closing panel can be slid in and out of the panel guide. In such a way, a very simple, efficient, and reliable panel guide is formed.

According to a preferred embodiment, the closing panel comprises a catch element configured for being contacted by the flap when the flap is moved between the first retracted position and the second retracted position, so that by contact with the catch the flap may push the closing panel from the elongated position to the shortened position when the flap is moved from the first retracted position to the second retracted position. The catch element might be formed as, e.g., a rod, panel, or other projection extending away from the inner surface of the closing panel. The catch element might also comprise a flap contact roller mounted directly or indirectly to the closing panel, e.g., to a rod of the catch element, and configured for rolling contact with the leading-edge section of the flap. By such a catch element a defined and reliable contact between the leading-edge section of the flap and the closing panel is ensured when the flap is moved from the first retracted position to the second retracted position, thereby pushing the closing panel from the elongated position to the shortened position.

According to a preferred embodiment, the gap closing device comprises at least one biasing member configured to bias the closing panel towards the flap and, in particular, the catch element in contact with the flap, i.e., towards the elongated position. The biasing member might be, e.g., a linear spring coupled between the panel guide at one end and the closing panel at the other end. Such a biasing member forms a very simple, efficient and reliable means to passively move the closing panel from the shortened position back to the elongated position.

According to a preferred embodiment, the gap closing device comprises at least one stop member configured to limit movement of the closing panel beyond the elongated position, i.e., the stop member is configured such that movement of the closing panel towards the flap is stopped at the elongated position. The stop member is preferably attached to the panel guide or to the main wing, and is preferably configured to be contacted by the closing panel. Such a stop member allows to stop movement of the closing panel precisely at the intended position, i.e., at the elongated position.

A further aspect of the present invention relates to a gap closing device for the wing according to any of the embodiments explained above. The gap closing device comprises a closing panel and a panel guide. The closing panel is configured to form an extension of the lower rear panel of the main wing in a rearward direction. The panel guide is configured for movably mounting the closing panel to the main wing and configured for guiding movement of the closing panel between the elongated position and the shortened position. The features and effects explained above in connection with the wing apply vis-à-vis also to the gap closing device.

A further aspect of the present invention relates to an aircraft comprising the wing according to any of the embodiments explained above, and/or comprising the gap closing device according to any of the embodiments explained above. The features and effects explained above in connection with the wing and the gap closing device apply vis-à-vis also to the aircraft.

BRIEF DESCRIPTION OF THE DRAWINGS

Hereinafter, a preferred embodiment of the present invention is described in more detail by means of a drawing. The drawing shows in FIG. 1 a perspective view of an aircraft according to an embodiment of the invention, FIG. 2 a schematic cross-sectional view across the span direction of a wing according to an embodiment of the invention with a focus on the trailing edge high lift assembly including the flap in an extended position, FIG. 3 the wing shown in FIG. 2 with the flap in a first retracted position, FIG. 4 the wing shown in FIG. 2 with the flap in a second retracted position, FIG. 5 a schematic perspective view of the gap closing device shown in FIG. 2 with the closing panel in the elongated position, and FIG. 6 the gap closing device shown in FIG. 5 with the closing panel in the shortened position.

DETAILED DESCRIPTION OF THE PREFERRED EMBODIMENTS

Figure 1:
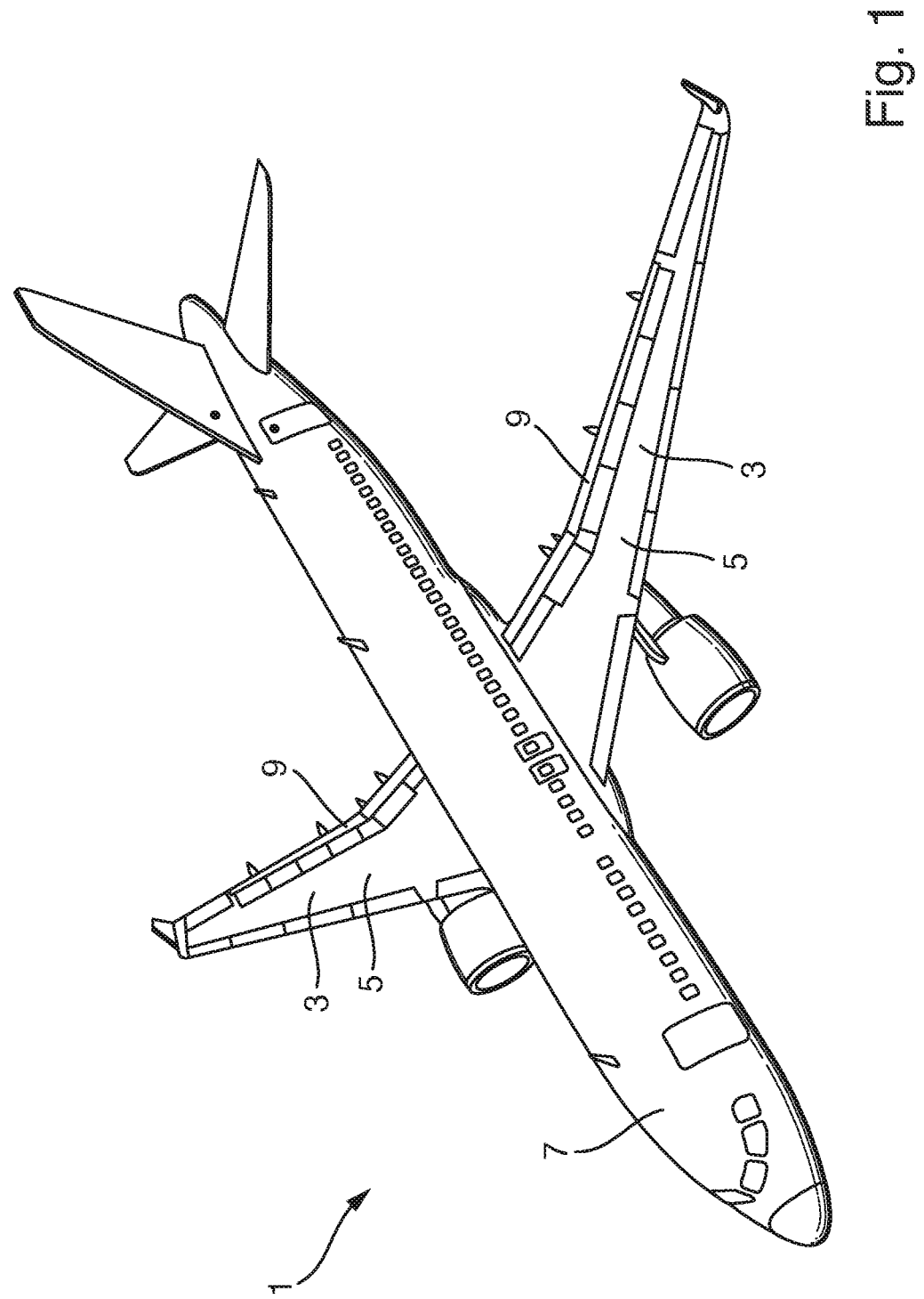

FIG. 1 shows an exemplary aircraft 1 according to an embodiment of the present invention. The aircraft 1 comprises a wing 3 including a main wing 5 mounted to a fuselage 7, and a trailing edge high lift assembly 9 including a flap 11 movably mounted to the main wing 5.

FIGS. 2 to 6 illustrate an embodiment of the wing 3 of the aircraft 1 shown in FIG. 1. The wing 3 comprises a main wing 5 and a trailing edge high lift assembly 9. The trailing edge high lift assembly 9 is movably arranged at a trailing edge of the main wing 5 and comprises a flap 11 and a connection assembly (not shown). The connection assembly movably mounts the flap 11 to the main wing 5, such that the flap 11 is movable between first and second retracted positions 12, 14 with a reduced chord length and curvature of the wing 3, and an extended position 15 with an extended chord length and curvature of the wing 3.

In the extended position 15 a gap 16 is present between a lower rear panel 7 of the main wing 5 and a leading-edge section 19 of the flap 11 to allow an air flow 21 to pass between the flap 11 and the main wing 5, in order to energize the air flow along the top surface of the flap 11. In the retracted positions 12, 14 the gap 16 is closed or minimized, so that an air flow 21 between the flap 11 and the main wing 5 is inhibited or at least minimized, in order to reduce drag.

Figures 2, 3, 4:
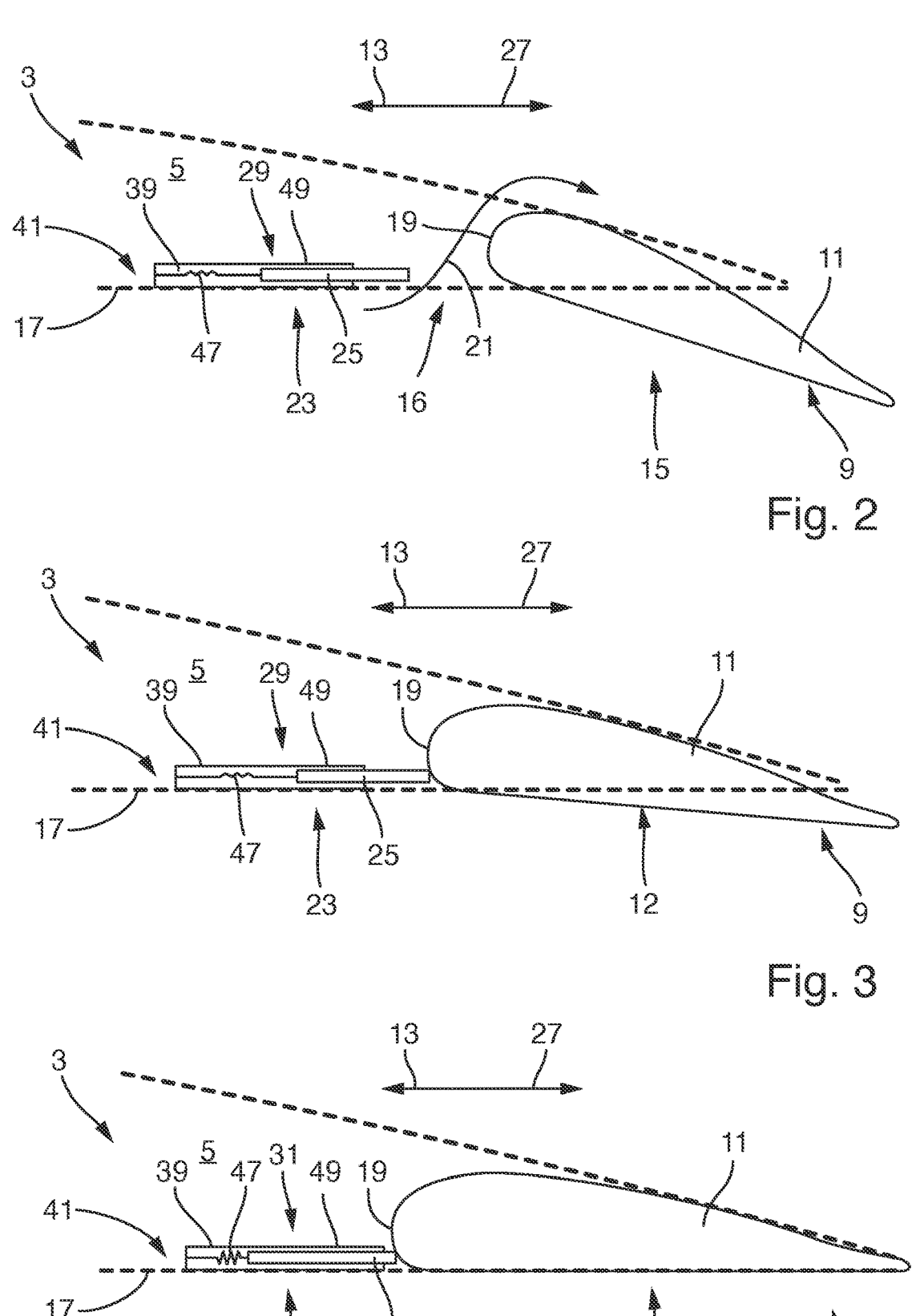

The flap 11 is movable between an extended position 15, as shown in FIG. 2, a first retracted position 12, as shown in FIG. 3, and a second retracted position 14, as shown in FIG. 4. The first retracted position 12 in the present embodiment is a neutral retracted position intended for cruise flight under normal conditions. In the second retracted position 14, which in the present embodiment is a negative retracted position, the flap 11 is moved beyond the first retracted position 12 in a forward direction 13 further towards a leading edge of the main wing 5, thereby further reducing the chord length of the wing 3 compared to the first retracted position 12.

Further, the wing 3 comprises a gap closing means for closing or minimizing the gap 16 comprising a gap closing device 23 configured to close or minimize the gap 16 in both the first retracted position 12 (see FIG. 3) and the second retracted position 14 (see FIG. 4) of the flap 11, and to open the gap 16 in the at least one extended position 15 (see FIG. 2) of the flap 11. The gap closing device 23 is a passive device and does not include an actuator.

The gap closing device 23 comprises a closing panel 25 forming an extension of the lower rear panel 17 of the main wing 5 in the rearward direction 27. The closing panel 25 is movable relative to the lower rear panel 17 of the main wing 5 between an elongated position 29 (see FIGS. 2, 3 and 5), where the closing panel 25 forms a maximum extension of the lower rear panel 17 of the main wing 5, and a shortened position 31 (see FIGS. 4 and 6), where the closing panel 25 forms a minimum extension of the lower rear panel 17 of the main wing 5. The gap closing device 23 is configured such that when the flap 11 is in the extended position 15 and in the first retracted position 12 the closing panel 25 is in the elongated position 29, while when the flap 11 is in the second retracted position 14 the closing panel 25 is in the shortened position 31.

Figure 5:
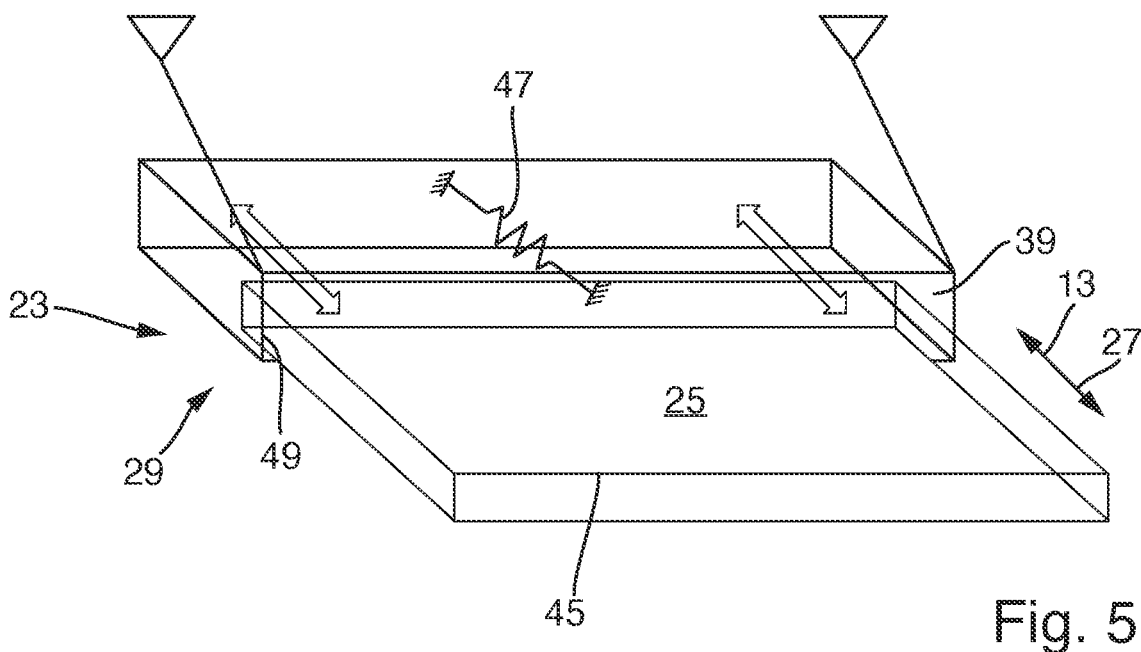
Figure 6:
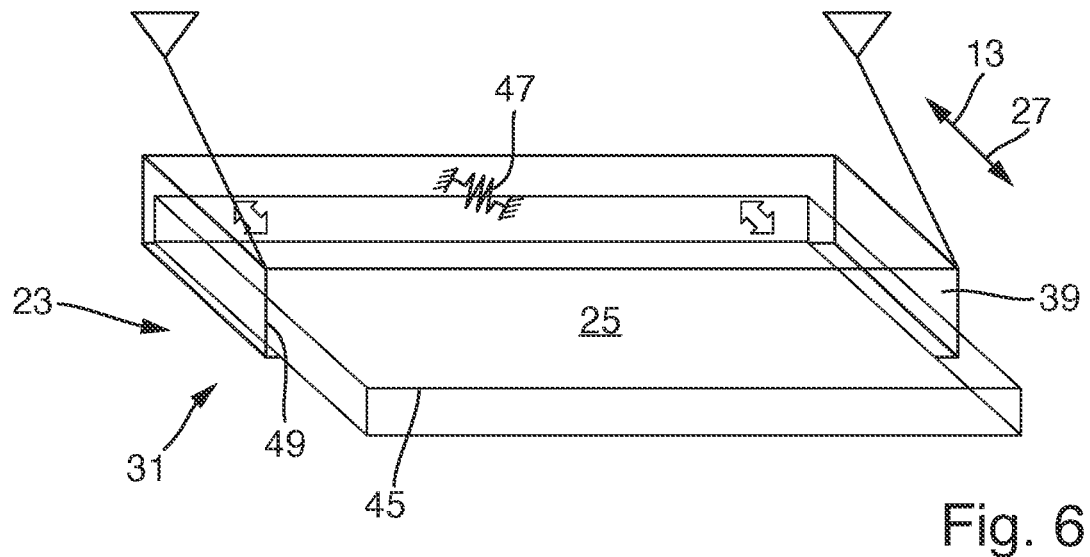

As shown in more detail in FIGS. 5 and 6, the gap closing device 23 comprises a panel guide 39 movably mounting the closing panel 25 to the main wing 5 and configured for guiding movement of the closing panel 25 between the elongated position 29 and the shortened position 31. The panel guide 39 is a linear guide configured for guiding the closing panel 25 essentially in a way of a linear extension of the lower rear panel 17 of the main wing 5. The panel guide 39 is arranged at the inner surface 41 of the lower rear panel 17 of the main wing 5 in parallel to the lower rear panel 17 of the main wing 5. The gap closing device 23 is formed in a way of a drawer system, wherein the panel guide 39 is formed as a drawer box slidably receiving the closing panel 25 in the way of a drawer, so that the closing panel 25 can be slid in and out of the panel guide 39.

The closing panel 25 comprises a catch element 45 configured for being contacted by the flap 11 when the flap 11 is moved between the first retracted position 12 and the second retracted position 14, so that by contact with the catch element 45, the flap 11 may push the closing panel 25 from the elongated position 29 to the shortened position 31 when the flap 11 is moved from the first retracted position 12 to the second retracted position 14. The catch element 45 might be formed, e.g., as a rod, panel, or other projection extending away from the inner surface of the closing panel 25. The catch element 45 might comprise a flap contact roller (not shown) mounted directly or indirectly to the closing panel 25 and configured for rolling contact with the leading-edge section of the flap 11.

The gap closing device 23 comprises a biasing member 47 configured to bias the closing panel 25 towards the flap 11, and the catch element 45 in contact with the leading-edge section of the flap 11, i.e., towards the elongated position 29. The biasing member 47 in the present embodiment is a linear spring coupled between the closing panel 25 and the panel guide 39.

The gap closing device 23 further comprises a stop member 49 configured to limit movement of the closing panel 25 beyond the elongated position 29, i.e., the stop member 49 is configured such that movement of the closing panel 25 towards the flap 11 is stopped at the elongated position 29. The stop member 49 in the present embodiment is attached to the panel guide 39 and is configured to be contacted by the closing panel 25.

By such a wing 3 according to the invention, introducing a second retracted position 14 with reduced chord length, drag and structural loading can be further reduced and flight parameters can be optimized, while at the same time the gap 16 between the lower rear panel 17 of the main wing 5 and the leading edge section 19 of the flap 11 can be kept closed by the gap closing device 23 in both the first retracted position 12 and the second retracted position 14, and can be kept open for air to pass through in the extended position 15, in order to achieve optimized aerodynamic performance throughout all positions of the flap 11.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a main wing, and
a trailing edge high lift assembly movably arranged at a trailing edge of the main wing, the trailing edge high lift assembly comprising
    a flap, and
    a connection assembly movably mounting the flap to the main wing, such that the flap is movable between at least one retracted position and at least one extended position,
wherein, in the at least one extended position, a gap is present between a lower rear panel of the main wing and a leading-edge section of the flap, and
wherein, in the at least one retracted position, the gap is closed or minimized,
wherein the flap is movable between at least one extended position, a first retracted position, and a second retracted position where the flap is moved beyond the first retracted position in a forward direction, and wherein the wing comprises a gap closing means for closing or minimizing the gap in both the first retracted position and the second retracted position of the flap, and to open the gap in the at least one extended position of the flap, wherein the gap closing means comprises a closing panel forming an extension of the lower rear panel of the main wing in a rearward direction, wherein the closing panel is movable relative to the lower rear panel of the main wing between an elongated position and a shortened position, and, wherein the gap closing means comprises at least one biasing member biasing the closing panel towards the flap in a same direction in both the elongated position and the shortened position.

2. The wing according to claim 1, wherein the gap closing means is a passive device.

3. The wing according to claim 1, wherein the gap closing means is movably mounted to the main wing.

4. The wing according to claim 1, wherein the gap closing means is movable in one direction by contact with the flap when the flap is moved relative to the main wing and is movable in the opposite direction by the biasing member.

5. The wing according to claim 1, wherein the gap closing means is configured such that when the flap is in the at least one extended position, and in the first retracted position, the closing panel is in the elongated position, while when the flap is in the second retracted position, the closing panel is in the shortened position.

6. The wing according to claim 1, wherein the gap closing means comprises a panel guide movably mounting the closing panel to the main wing, and configured to guide movement of the closing panel between the elongated position and the shortened position.

7. The wing according to claim 6, wherein the panel guide is a linear guide configured to guide the closing panel in a way of a linear extension of the lower rear panel of the main wing.

8. The wing according to claim 6, wherein the panel guide is arranged at an inner surface of the lower rear panel of the main wing.

9. The wing according to claim 6, wherein the gap closing means is formed as a drawer system, wherein the panel guide is formed as a drawer box slidably receiving the closing panel in a way of a drawer.

10. The wing according to claim 1, wherein the closing panel comprises a catch element configured to be contacted by the flap when the flap is moved between the first retracted position and the second retracted position.

11. The wing according to claim 1, wherein the gap closing means comprises at least one stop member configured to limit movement of the closing panel beyond the elongated position.

12. A gap closing means for the wing according to claim 1, comprising a panel guide movably mounting the closing panel to the main wing and configured for guiding movement of the closing panel between the elongated position and the shortened position.

13. An aircraft comprising the gap closing means according to claim 12.

14. The gap closing means according to claim 12, wherein the gap closing means is a passive device.

15. An aircraft comprising the wing according to claim 1.

16. The wing according to claim 1, wherein the gap closing means does not include an actuator.

17. The wing according to claim 1, wherein the at least one biasing member comprises a spring.

18. A wing for an aircraft, comprising a main wing, and a trailing edge high lift assembly movably arranged at a trailing edge of the main wing, the trailing edge high lift assembly comprising a flap, and a connection assembly movably mounting the flap to the main wing, such that the flap is movable between at least one retracted position and at least one extended position, wherein, in the at least one extended position, a gap is present between a lower rear panel of the main wing and a leading-edge section of the flap, and wherein, in the at least one retracted position, the gap is closed or minimized, wherein the flap is movable between at least one extended position, a first retracted position, and a second retracted position where the flap is moved beyond the first retracted position in a forward direction, and wherein the wing comprises a gap closing means for closing or minimizing the gap in both the first retracted position and the second retracted position of the flap, and to open the gap in the at least one extended position of the flap, wherein the gap closing means comprises a closing panel forming an extension of the lower rear panel of the main wing in a rearward direction, wherein the closing panel is movable relative to the lower rear panel of the main wing between an elongated position and a shortened position, wherein the gap closing means comprises at least one biasing member configured to bias the closing panel towards the flap in a same direction in both the elongated position and the shortened position, wherein the gap closing means is a passive device.

19. A wing for an aircraft, comprising a main wing, and a trailing edge high lift assembly movably arranged at a trailing edge of the main wing, the trailing edge high lift assembly comprising a flap, and a connection assembly movably mounting the flap to the main wing, such that the flap is movable between at least one retracted position and at least one extended position, wherein, in the at least one extended position, a gap is present between a lower rear panel of the main wing and a leading-edge section of the flap, and wherein, in the at least one retracted position, the gap is closed or minimized, wherein the flap is movable between at least one extended position, a first retracted position, and a second retracted position where the flap is moved beyond the first retracted position in a forward direction, and wherein the wing comprises a gap closing means for closing or minimizing the gap in both the first retracted position and the second retracted position of the flap, and to open the gap in the at least one extended position of the flap, wherein the gap closing means comprises a closing panel forming an extension of the lower rear panel of the main wing in a rearward direction, wherein the closing panel is movable relative to the lower rear panel of the main wing between an elongated position and a shortened position, wherein the gap closing means comprises at least one biasing member configured to bias the closing panel towards the flap in a same direction in both the elongated position and the shortened position, wherein the at least one biasing member comprises a spring.

* * * * *